United States Patent [19]

Makino

[11] Patent Number: 5,745,395

[45] Date of Patent: Apr. 28, 1998

[54] SIGNAL PROCESSING APPARATUS AND METHOD

[75] Inventor: Jun Makino, Kunitachi, Japan

[73] Assignee: Canon Kabushiki Kaisha, Tokyo, Japan

[21] Appl. No.: 588,397

[22] Filed: Jan. 18, 1996

[30] Foreign Application Priority Data

Jan. 20, 1995 [JP] Japan .................................. 7-026001

[51] Int. Cl.$^6$ ...................................................... G06F 17/10
[52] U.S. Cl. ............................................................ 364/724.17
[58] Field of Search ..................... 364/724.011, 724.012, 364/724.17

[56] References Cited

U.S. PATENT DOCUMENTS 4,852,034  7/1989  Takayama ........................ 364/724.012
5,381,356  1/1995  Takahashi .......................... 364/724.17
5,523,962  6/1996  Yoshino et al. .................... 364/724.17

*Primary Examiner*—Tan V. Mai
*Attorney, Agent, or Firm*—Fitzpatrick, Cella, Harper & Scinto

[57] ABSTRACT

A signal processing apparatus subtracts a second sampled signal from a first sampled signal to generate a first resultant signal, the first sampled signal being delayed for a time period of 4nT to create the second sampled signal, wherein n is a positive integer and T is a sampling time period. The apparatus adds the first resultant signal to a third sampled signal to generate a second resultant signal, the second resultant signal being delayed for a time period of 4T to create the third sampled signal. The apparatus subtracts a fourth sampled signal from the second resultant signal and outputs a third resultant signal, the second resultant signal being delayed for a time period of 2T to create the fourth sampled signal. A signal processing method corresponding to the signal processing apparatus is also provided.

20 Claims, 7 Drawing Sheets

SIGNAL PROCESSING APPARATUS AND METHOD

BACKGROUND OF THE INVENTION

1. Field of the Invention

This invention relates to a signal processing apparatus and method for extracting a signal of a specific frequency.

2. Description of the Related Art

Various kinds of circuits have been realized for signal processing apparatuses for extracting a component of a specific frequency from a signal. FIG. 1 is a circuit diagram illustrating an active filter which uses operational amplifiers. FIGS. 2 and 3 illustrate digital band-pass filters each of which realizes filter characteristics of an active filter with a digital circuit including adders, multipliers and delay devices. FIG. 2 is a block diagram illustrating the configuration of an IIR(infinite-duration impulse-response)-type digital band-pass filter; and FIG. 3 is a block diagram illustrating the configuration of an FIR(finite-duration impulse-response)-type band-pass filter.

However, when realizing a conventional narrow-band band-pass filter, the order of the filter is high, resulting in a large scale circuit and inferior stability. For example, in the analog band-pass filter shown in FIG. 1, the number of circuit elements required to implement a high-order narrow-band filter is large, and thus the filter tends to oscillate and is difficult to manufacture.

In the IIR-type digital band-pass filter shown in FIG. 2, limit oscillation is apt to occur when a high-order narrow-band filter is realized. In addition, since multipliers are used to implement the filter coefficients, and the number of narrowband filter coefficients is large, the circuit scale is undesirably large.

In the FIR-type digital band-pass filter shown in FIG. 3, in order to implement a large number of narrowband filter coefficients, a large number of multipliers are required. This results in a great amount of time required for executing calculations by the multipliers, and as in the IIR-type filter, the circuit scale is undesirably large.

SUMMARY OF THE INVENTION

It is an object of the present invention to provide a signal processing apparatus and method which can solve the above-described problems.

It is another object of the present invention to provide a signal processing apparatus which can stably extract a signal of a specific frequency and which can be more easily realized at a low cost, without increasing circuit scale.

It is still another object of the present invention to provide a signal processing method which can stably extract a signal of a specific frequency.

According to one aspect of the present invention, a signal processing apparatus is provided. The signal processing apparatus subtracts a second sampled signal from a first sampled signal to generate a first resultant signal, the first sample signal being delayed for a time period of 4nT to create the second sampled signal, wherein n is a positive integer and T is a sampling time period. The apparatus adds the first resultant signal to a third sampled signal to generate a second resultant signal, the second resultant signal being delayed for a time period of 4T to create the third sampled signal. The apparatus subtracts a fourth sampled signal from the second resultant signal and outputs a third resultant signal, the second resultant signal being delayed for a time period of 2T to create the fourth sampled signal.

According to another aspect of the present invention, the signal processing apparatus subtracts a second sampled signal from a first sampled signal to generate a first resultant signal, the first sampled signal being delayed for a time period of 4nT to create the second sampled signal, wherein n is a positive integer and T is a sampling time period. The apparatus adds the first resultant signal to a third sampled signal to generate a second resultant signal, the second resultant signal being delayed for a time period of 4T to create the third sampled signal. The apparatus subtracts a fourth sampled signal from the second resultant signal to generate a third resultant signal, the second resultant signal being delayed for a time period of 4mT to create the fourth sampled signal, wherein m is a positive integer. The apparatus adds the third resultant signal to a fifth sampled signal to generate a fourth resultant signal, the fourth resultant signal being delayed for a time period of 4T to create the fifth sampled signal. The apparatus subtracts a sixth sampled signal from the fourth resultant signal and outputs a fifth resultant signal, the fourth resultant signal being delayed for a time period of 2T to create the sixth sampled signal.

In another aspect of the present invention, integer m is set equal to integer n.

In still another aspect of the present invention, the first sampled signal is obtained by sampling a signal reproduced from a recording medium, and the apparatus extracts tracking signal components from the first sampled signal.

In yet another aspect of the invention, the apparatus inputs an analog signal, converts the analog signal to the first sampled signal in synchronization with clock pulses having a predetermined frequency and generates the first sampled signal.

In yet another aspect of the invention, a signal processing method corresponding to the above-described signal processing apparatus is provided.

The foregoing and other objects, advantages and features of the present invention will become more apparent from the following description of the preferred embodiments taken in conjunction with the accompanying drawings.

DESCRIPTION OF THE PREFERRED EMBODIMENTS

A description will now be provided of band-pass filters according to the embodiments of the present invention.

First Embodiment

Figure 1:
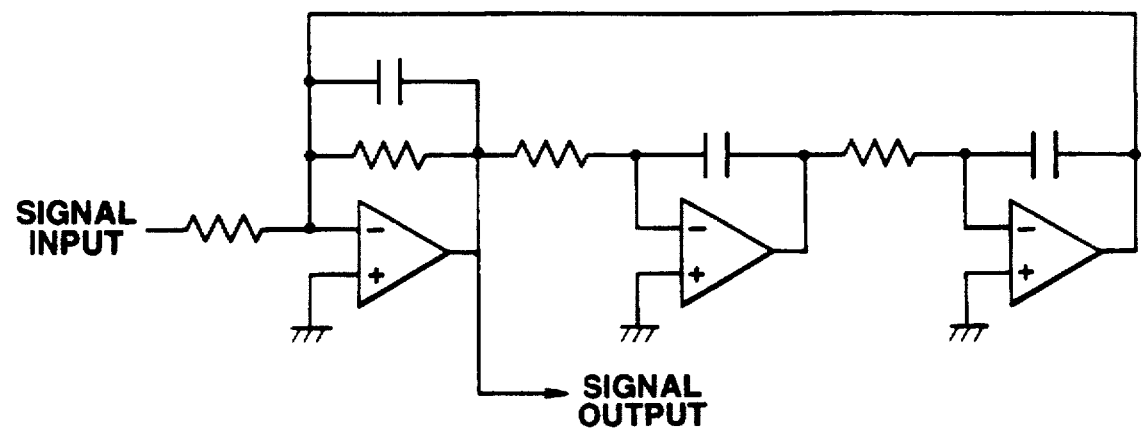
FIG. 1 is a circuit diagram illustrating the configuration of an active filter which uses operational amplifiers.
Figure 2:
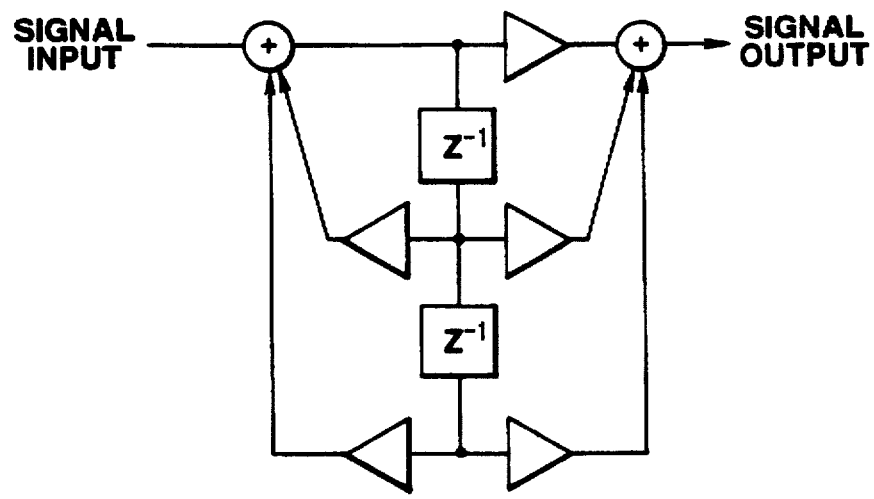
FIG. 2 is a block diagram illustrating the configuration of an IIR-type digital band-pass filter.
Figure 3:
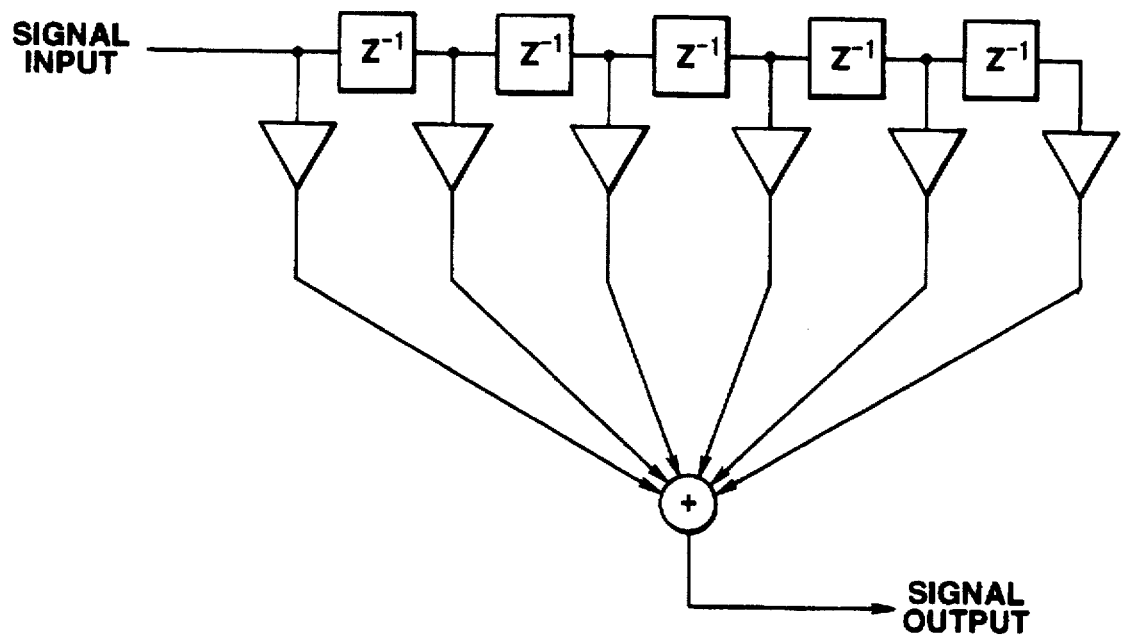
FIG. 3 is a block diagram illustrating the configuration of an FIR-type digital band-pass filter.
Figure 4:
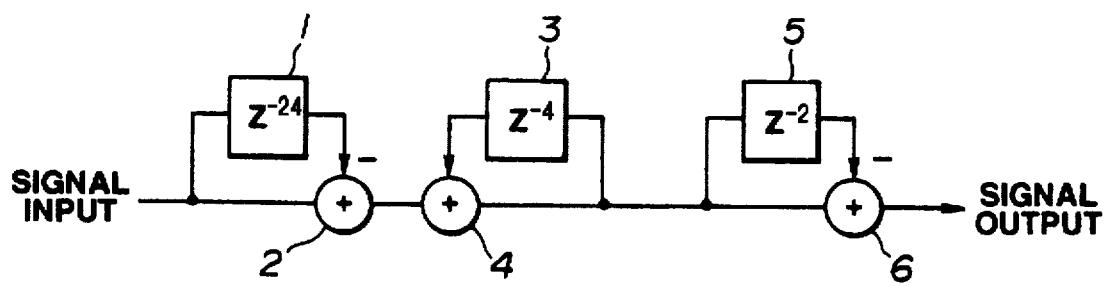
FIG. 4 is a block diagram illustrating the configuration of a band-pass filter according to a first embodiment of the present invention.

FIG. 4 is a block diagram illustrating the configuration of a band-pass filter according to a first embodiment of the present invention. In FIG. 4, a delay device 1 comprises a plurality of delay elements, the number of which equals a multiple of four, for example, 4×6=24 in the present embodiment. Reference numeral 2 represents a subtracter. A delay device 3 comprises four delay elements. Reference numeral 4 represents an adder. The delay device 1, the subtracter 2, the delay device 3 and the adder 4 constitute a comb-filter unit which is a component of the bandpass filter of the present embodiment. A delay device 5 comprises two delay elements. Reference numeral 6 represents a subtracter. The delay device 5 and the subtracter 6 constitute a notch-filter unit.

Since the band-pass filter of the present embodiment operates with a clock signal whose frequency equals four times the extraction frequency, the delay time of each delay element is 1/(4×the extraction). An input signal which includes the signal to be extracted at the extraction frequency is input to the band-pass filter and is sampled at four times the extraction frequency.

The delay devices 1, 3 and 5 are initially reset by a reset circuit (not shown) when starting the following operation. After resetting the delay devices, the input signal is input to the subtracter 2 and to the delay device 1. Delay device 1 delays the input signal to generate a delayed signal. The subtracter 2 subtracts the delayed signal from the input signal. The resultant signal is input to the adder 4, and is added to the signal delayed by the delay device 3. The output of the adder 4 is input to delay device 3 and to the notch-filter unit, that is, to the adder 6 and to the delay device 5. The adder 6 adds the output signal from the adder 4 to the signal output from the delay device 5.

Figure 5:
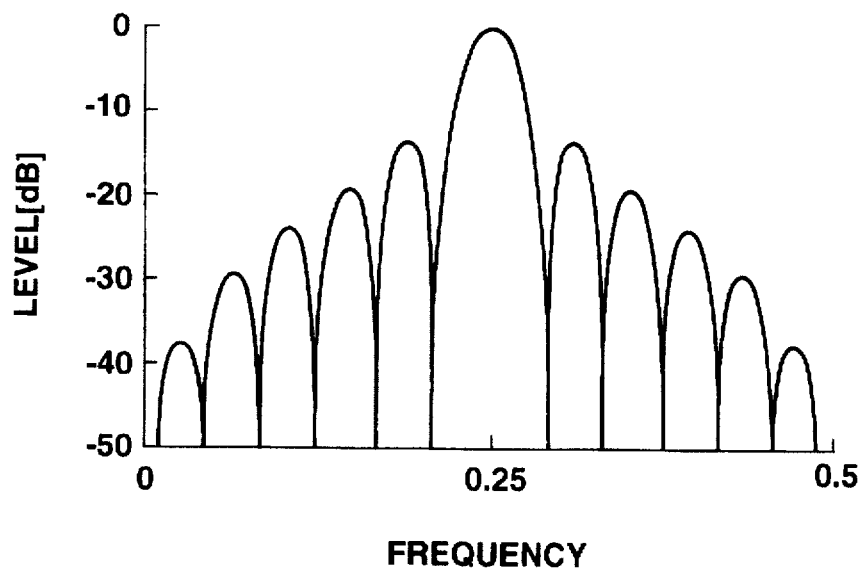
FIG. 5 is a graph illustrating a frequency characteristic of the band-pass filter shown in FIG. 4.
Figure 6:
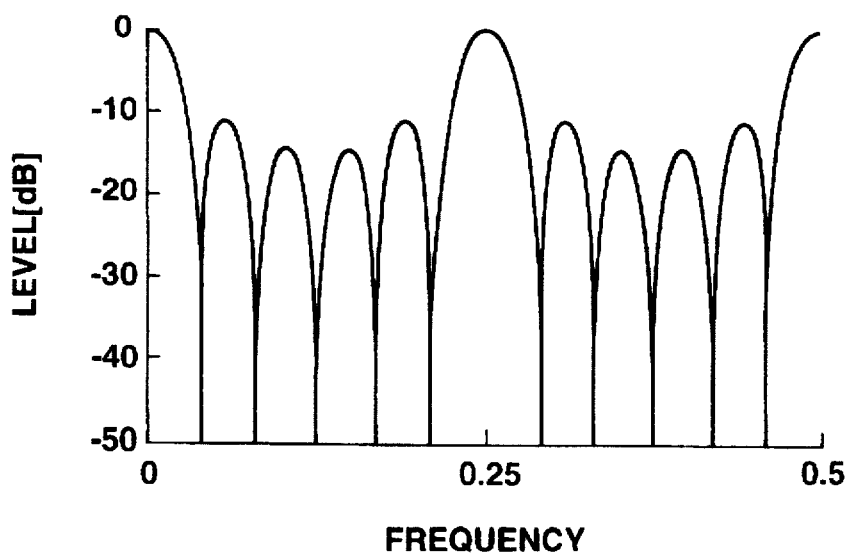
FIG. 6 is a graph illustrating a frequency characteristic of a comb-filter unit, a component of the band-pass filter shown in FIG. 4.
Figure 7:
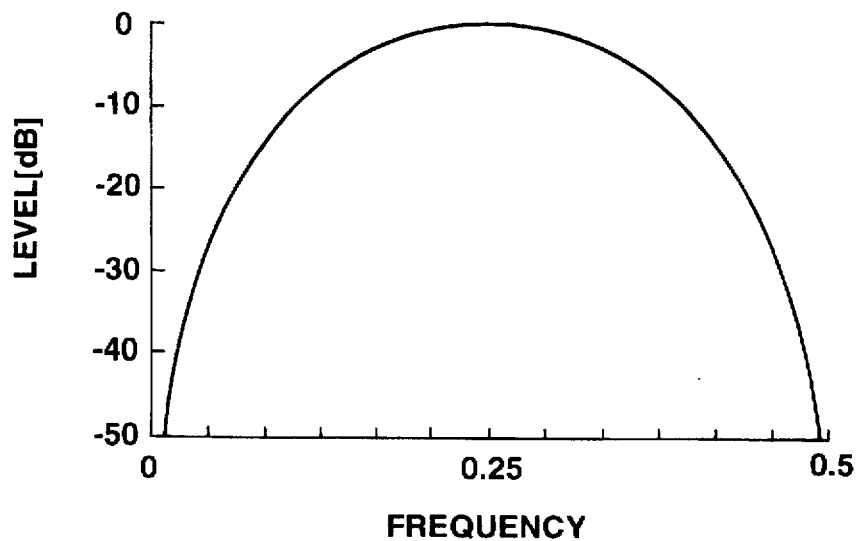
FIG. 7 is a graph illustrating a frequency characteristic of a notch-filter unit, another component of the band-pass filter shown in FIG. 4.

FIG. 5 is a graph illustrating a frequency characteristic of the band-pass filter. FIG. 6 is a graph illustrating a frequency characteristic of the comb-filter unit. FIG. 7 is a graph illustrating a frequency characteristic of the notch-filter unit. In FIGS. 5, 6 and 7, the frequency (the abscissa) is normalized such that the sampling frequency is 1 (frequency unit) and the extraction frequency is 0.25 (frequency unit).

In this band-pass filter, as shown in FIG. 6, the comb-filter unit extracts signals around the frequencies of 0, 0.25 and 0.5. By passing extracted signals through the notch-filter unit, which removes the signal components at the frequencies of 0 and 0.5, as shown in FIG. 7, a band-pass filter having a pass band centered at the frequency of 0.25 is obtained, as shown in FIG. 5.

In the present embodiment the delay device 1 comprises 24 delay elements. However, the number of delay elements is not limited to this value. A band-pass filter having a pass band centered at the frequency of 0.25 can be manufactured without changing the other components, shown in FIG. 4, provided that the number of delay elements in delay device 1 equals a multiple of four. By increasing the number of delay elements in multiples of four, a band-pass filter having a narrower pass band can be obtained.

Although the band-pass filter of the present embodiment has ripple in stop-band regions, this filter is sufficient for use in applications in which stop-band ripple is of less concern.

Second Embodiment

Figure 8:
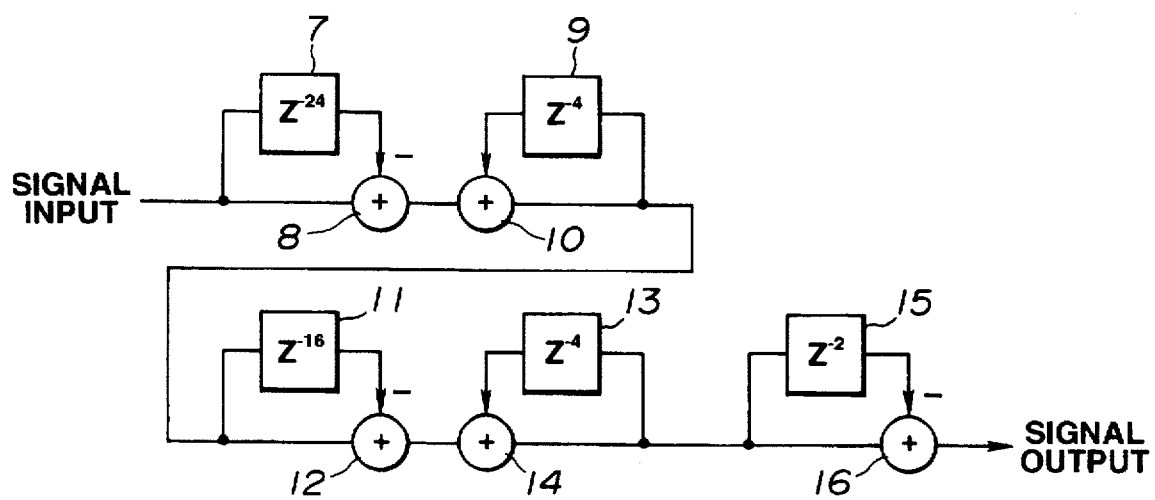
FIG. 8 is a block diagram illustrating the configuration of a band-pass filter according to a second embodiment of the present invention.

Next, a description will be provided of a band-pass filter according to a second embodiment of the present invention. FIG. 8 is a block diagram illustrating the configuration of the band-pass filter of the second embodiment. The band-pass filter of the second embodiment effectively reduces the stop-band ripple components present in the first embodiment.

In FIG. 8, a delay device 7 comprises a plurality of delay elements, the number of which equals a multiple of four, for example, 4×6=24 in the present embodiment. Reference numeral 8 represents a subtracter. A delay device 9 comprises four delay elements. Reference numeral 10 represents an adder. The delay device 7, the subtracter 8, the delay device 9 and the adder 10 constitute a first comb-filter unit, the operation of which is identical to the comb-filter unit of the first embodiment.

A delay device 11 comprises a plurality of delay elements, the number of which equals a multiple of four, for example, 4×4=16 in the present embodiment. The ratio of the number of delay elements of the delay device 7 to the number of delay elements of the delay device 11 is set to 3:2. Reference numeral 12 represents a subtracter. A delay device 13 comprises four delay elements. Reference numeral 14 represents an adder. The delay device 11, the subtracter 12, the delay device 13 and the adder 14 constitute a second comb-filter unit, which is serially connected to the output of the first comb-filter unit.

A delay device 15 comprises two delay elements. Reference numeral 16 represents a subtracter. The delay device 15 and the subtracter 16 constitute a notch-filter unit, which is serially connected to the output of the second comb-filter unit. The operation of the notch-filter unit is identical to the notch-filter unit of the first embodiment.

Since the band-pass filter of the present embodiment operates with a clock signal whose frequency equals four times the extraction frequency, the delay time of each delay element is 1/(4×the extraction frequency). An input signal which includes the signal to be extracted at the extraction frequency is input to the band-pass filter and is sampled at four times the extraction frequency. The input signal is input to the first comb-filter unit, the output of which is input to the second comb-filter unit. The output of the second comb-filter unit is input to the notch-filter unit, the output of which is the band-pass filter output.

Figure 9:
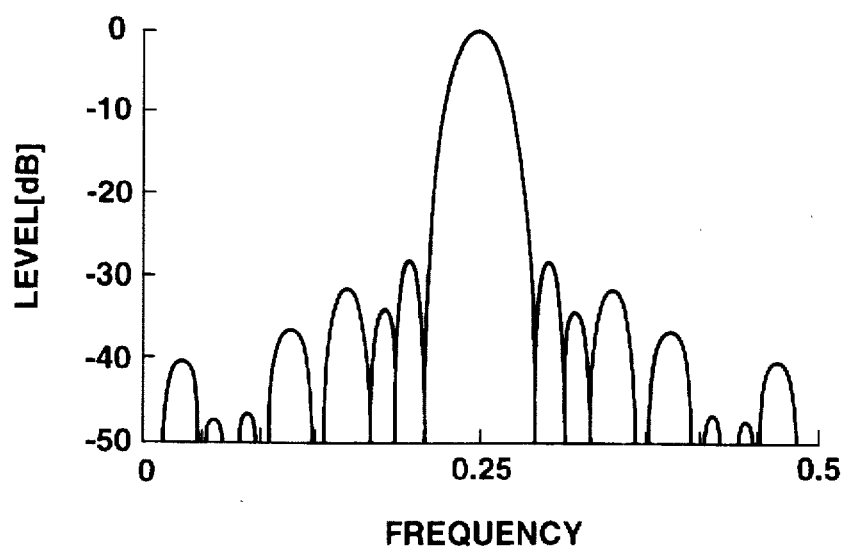
FIG. 9 is a graph illustrating a frequency characteristic of the band-pass filter shown in FIG. 8.

FIG. 9 is a graph illustrating a frequency characteristic of the band-pass filter of the second embodiment. In FIG. 9, the frequency at the abscissa is normalized such that the sampling frequency is 1, as in the first embodiment. In the present embodiment, by serially cascading two comb-filter units, ripple components in the stop-band regions can be reduced over those of the first embodiment. By setting the ratio of the number of delay elements in the delay unit 7 of the first comb-filter unit to the number of delay elements in the delay unit 11 of the second comb-filter unit to 3:2, the ripple components can be effectively removed.

Figure 10:
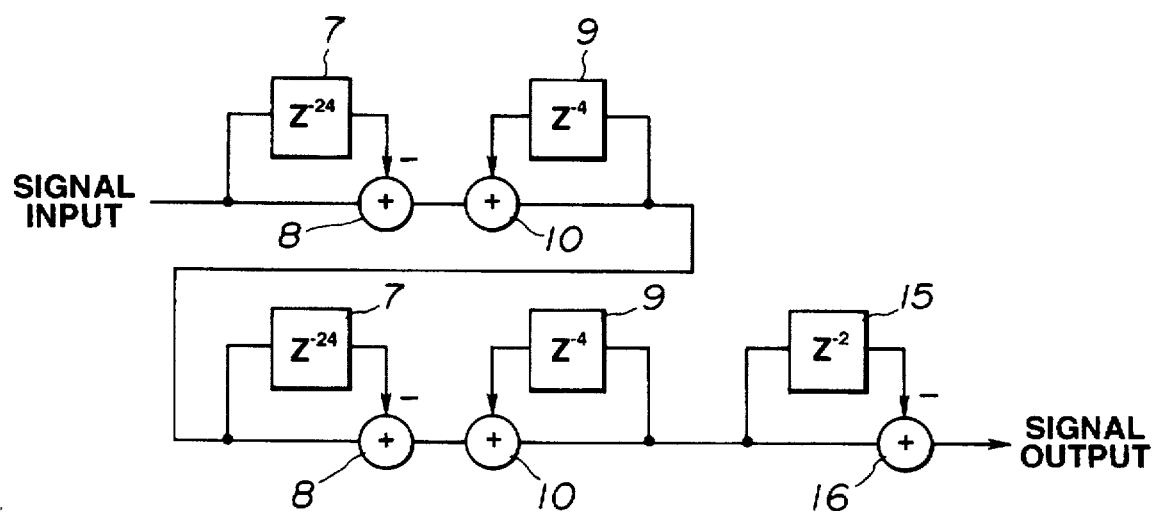
FIG. 10 is a block diagram illustrating the configuration of a band-pass filter when comb-filter units are provided in two stages, according to a modification of the second embodiment.

Third Embodiment FIG. 10 is a block diagram illustrating the configuration of a band-pass filter of a third embodiment in which comb-filter units are provided in two cascaded stages, according to a modification of the second embodiment. In the band-pass filter of the third embodiment, the numbers of delay elements in the delay devices 7 of the first and second comb-filter units are equal, so that the first and second comb-filter units are identical. The components of the third embodiment are indicated by the same reference numerals as those of the second embodiment.

The band-pass filter of the third embodiment shown in FIG. 10 has 58 delay elements in total, while the band-pass filter of the second embodiment has 50 delay elements in total. Therefore, the band-pass filter of the second embodiment has fewer delay elements than the band-pass filter of the third embodiment.

Figure 11:
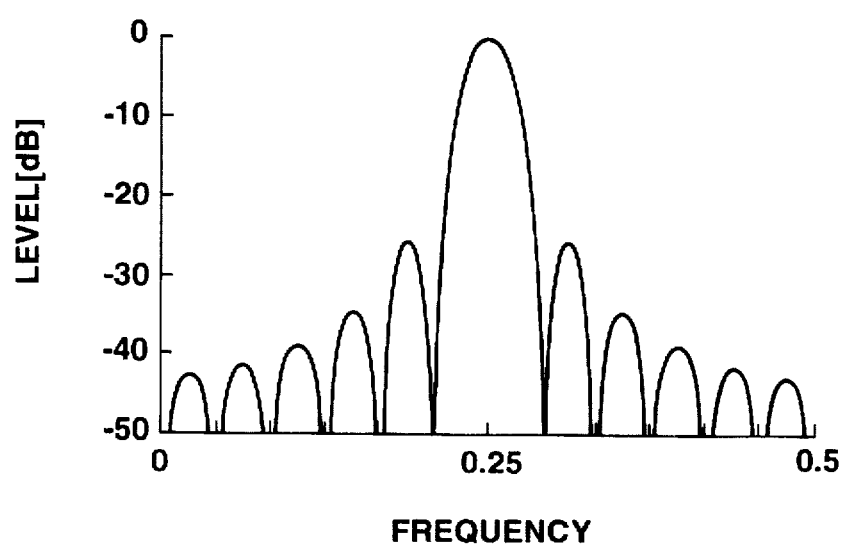
FIG. 11 is a graph illustrating a frequency characteristic of the band-pass filter shown in FIG. 10.
Figure 12:
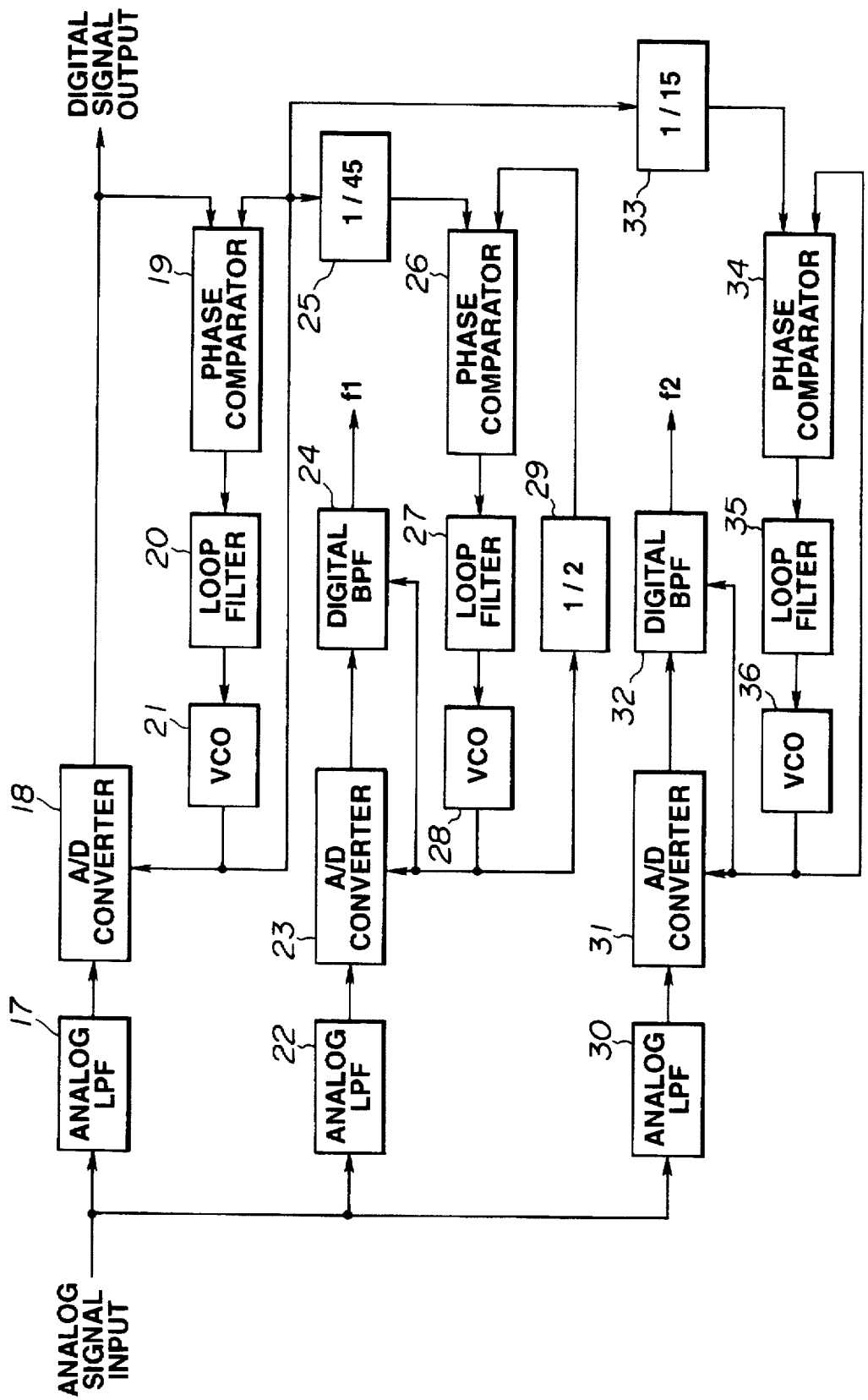
FIG. 12 is a block diagram illustrating the configuration of a reproducing circuit of a commercial digital VCR (video cassette recorder) to which the band-pass filter of the first or second embodiment is applied.

FIG. 11 is a graph illustrating a frequency characteristic of the band-pass filter of the third embodiment. A comparison of FIGS. 9 and 11 indicates that, although the two band-pass filters have substantially the same pass-band width, the ripple components in stop-band regions are smaller in the second embodiment than in the third Specific Application Next, a description will be provided of an example of an application of the band-pass filter of the first embodiment or the second embodiment. FIG. 12 is a block diagram illustrating the configuration of a reproducing circuit of a commercial digital VCR in which the band-pass filter is used. In the consumer-use digital VCR, it is necessary to reproduce a recorded main signal by decoding it, and to extract signals having two different frequencies leaking from adjacent tracks in order to perform tape tracking.

In FIG. 12, there are shown an analog low-pass filter 17, an A/D converter 18, a phase comparator 19, a loop filter 20, and an oscillator (VCO or voltage controlled oscillator) 21. The phase comparator 19, the loop filter 20 and the oscillator 21 constitute a PLL (phase-locked loop) circuit, which checks the phase component of a reproduced signal and extracts a synchronizing reproduced signal.

After removing unnecessary high-frequency components of the input signal by the low-pass filter 17, the input signal is sampled by the A/D converter 18 to generate a digital signal, and is output to a decoding/reproducing processing unit (not shown). The signal is also input to the phase comparator 19, which compares the phase of the input signal with the phase of a signal from the VCO 21. As a result of the comparison, the signal is smoothed by the loop filter 20. The oscillation frequency changes in accordance with the result of the comparison, and a clock signal synchronized with the reproduced signal is generated.

The circuitry shown in FIG. 12 also includes a circuit for separating a tracking signal. Reference numeral 22 represents an analog low-pass filter 22, and reference numeral 23 represents an A/D converter. Reference numeral 24 represents the digital band-pass filter according to one of the first and second embodiments. There are also shown a 1/45 frequency divider 25, a phase comparator 26, a loop filter 27, a VCO 28, and a 1/2 frequency divider 29.

The 1/45 frequency divider 25, the phase comparator 26, the loop filter 27, the VCO 28 and the 1/2 frequency divider 29 constitute a PLL circuit, which checks the phase components of a signal obtained by dividing the clock signal from the VCO 21 into 1/45 and a signal obtained by dividing the output of the VCO 28 into 1/2, and forms a signal synchronized with a period equal to 1/22.5 of the clock frequency of the reproduced signal.

After removing unnecessary high-frequency components of the input signal by the low-pass filter 22, the input signal is sampled by the A/D converter 23 and is output to the digital band-pass filter 24. The A/D converter 23 and the digital band-pass filter 24 are operated by a clock signal generated by the VCO 28. The frequency of the signal generated by the VCO 21 is divided into 1/45 by the 1/45 frequency divider 25, and the resultant signal is input to the phase comparator 26, which compares the phase component of the input signal with the phase component of a signal obtained by dividing the clock signal generated by the VCO 28 into 1/2 by the 1/2 frequency divider 29.

As a result of the comparison, the signal is smoothed by the loop filter 27. The oscillation frequency of the VCO 28 changes in accordance with the result of the comparison, and a synchronizing signal having a frequency equal to 1/22.5 of the clock signal of the reproduced signal is generated. This frequency corresponds to four times the frequency (f1=fb/90) of one of tracking signals of the commercial digital VCR. Accordingly, the digital band-pass filter 24 operates so as to extract the frequency component f1.

The circuitry shown in FIG. 12 also includes a circuit for separating another tracking signal. Reference numeral 30 represents an analog low-pass filter, and reference numeral 31 represents an A/D converter. Reference numeral 32 represents the digital band-pass filter according to one of the first and second embodiments. There are also shown a 1/15 frequency divider 33, a phase comparator 34, a loop filter 35, and a VCO 36.

The 1/15 frequency divider 33, the phase comparator 34, the loop filter 35 and the VCO 36 constitute a PLL circuit, which checks the phase components of a signal obtained by dividing the clock signal from the VCO 21 into 1/15 and a signal from the VCO 36, and forms a signal synchronized with a period equal to 1/15 of the clock frequency of the reproduced signal.

After removing unnecessary high-frequency components of the input signal by the low-pass filter 30, the input signal is sampled by the A/D converter 31, and is output to the digital band-pass filter 32. The A/D converter 31 and the digital band-pass filter 32 are operated by a clock signal generated by the VCO 36.

The frequency of the clock signal generated by the VCO 21 is divided into 1/15 by the 1/15 frequency divider 33, and the resultant signal is input to the phase comparator 34, which compares the phase component of the input signal with the phase component of the clock signal generated by the VCO 36. As a result of the comparison, the signal is smoothed by the loop filter 35. The oscillation frequency of the VCO 36 changes in accordance with the result of the comparison, and a synchronizing signal having a frequency equal to 1/15 of the clock signal of the reproduced signal is generated. This frequency corresponds to four times the frequency (f2=fb/60) of another tracking signal of the commercial digital VCR. Accordingly, the digital band-pass filter 32 operates so as to extract the frequency component f2.

In the present application, by making the synchronizing signal generated using the PLL circuit the clock signal of the digital band-pass filter, a target frequency component can be exactly and stably extracted.

In the present application, a common analog low passfilter may be used as the analog low-pass filters 22 and 30, and the frequency dividers 25 and 33 may be replaced by a combination of a 1/15 frequency divider and a 1/3 frequency divider.

According to the present invention, a band-pass filter can be configured by only adder-subtracters and delay devices without using multipliers.

According to the band-pass filter of the present invention, ripple components in the stop-band regions can be efficiently removed.

According to the band-pass filter of the present invention, a frequency component can be exactly and stably extracted by operating a synchronizing signal generated using an oscillation circuit. Furthermore, a frequency-division ratio can be easily changed by combining frequency division means.

The individual components designated by blocks in the drawings are all well known in the signal processing apparatus and method arts and their specific construction and operation are not critical to the operation or the best mode for carrying out the invention.

While the present invention has been described with respect what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A signal processing apparatus comprising:

first subtraction means for subtracting a second sampled signal from a first sampled signal to generate a first resultant signal, the first sampled signal being delayed for a time period of 4nT to create the second sampled signal, wherein n is a positive integer and T is a sampling time period;

addition means for adding the first resultant signal to a third sampled signal to generate a second resultant signal, the second resultant signal being delayed for a time period of 4T to create the third sampled signal; and second subtraction means for subtracting a fourth sampled signal from the second resultant signal and for outputting a third resultant signal, the second resultant signal being delayed for a time period of 2T to create the fourth sampled signal.

2. An apparatus according to claim 1, wherein the first sampled signal is generated by sampling a signal reproduced from a recording medium, and wherein said apparatus extracts a tracking signal component from the first sampled signal.

3. An apparatus according to claim 1, further comprising means for converting an analog signal input to said apparatus to the first sampled signal in synchronization with clock pulses having a predetermined frequency.

4. An apparatus according to claim 3, wherein the analog signal is a signal reproduced from a recording medium, and wherein said apparatus extracts a tracking signal component from the analog signal.

5. A signal processing apparatus comprising:

first subtraction means for subtracting a second sampled signal from a first sampled signal to generate a first resultant signal, the first sampled signal being delayed for a time period of 4nT to create the second sampled signal, wherein n is a positive integer and T is a sampling time period;

first addition means for adding the first resultant signal to a third sampled signal to generate a second resultant signal, the second resultant signal being delayed for a time period of 4T to create the third sampled signal;

second subtraction means for subtracting a fourth sampled signal from the second resultant signal to generate a third resultant signal, the second resultant signal being delayed for a time period of 4mT to create the fourth sampled signal, wherein m is a positive integer;

second addition means for adding the third resultant signal to a fifth sampled signal to generate a fourth resultant signal, the fourth resultant signal being delayed for a time period of 4T to create the fifth sampled signal; and third subtraction means for subtractin a sixth sampled signal from the fourth resultant signal and for outputting a fifth resultant signal, the fourth resultant signal being delayed for a time period of 2T to create the sixth sampled signal.

6. An apparatus according to claim 5, wherein the first sampled signal is generated by sampling a signal reproduced from a recording medium, and wherein said apparatus extracts a tracking signal component from the first sampled signal.

7. An apparatus according to claim 5, wherein m is equal to n.

8. An apparatus according to claim 7, wherein the first sampled signal is generated by sampling a signal reproduced from a recording medium, and wherein said apparatus extracts a tracking signal component from the first sampled signal.

9. An apparatus according to claim 5, further comprising means for converting an analog signal input to said apparatus to the first sampled signal in synchronization with clock pulses having a predetermined frequency.

10. An apparatus according to claim 9, wherein the analog signal is a signal reproduced from a recording medium, and wherein said apparatus extracts a tracking signal component from the analog signal.

11. A signal processing method comprising the steps of:

subtracting a second sampled signal from a first sampled signal to generate a first resultant signal, the first sampled signal being delayed for a time period of 4nT to create the second sampled signal, wherein n is a positive integer and T is a sampling time period;

adding the first resultant signal to a third sampled signal to generate a second resultant signal, the second resultant signal being delayed for a time period of 4T to create the third sampled signal; and subtracting a fourth sampled signal from the second resultant signal and for outputting a third resultant signal, the second resultant signal being delayed for a time period of 2T to create the fourth sampled signal.

12. A method according to claim 11, wherein the first sampled signal is generated by sampling a signal reproduced from a recording medium, and wherein said method extracts a tracking signal component from the first sampled signal.

13. A method according to claim 11, further comprising means the steps of inputting an analog signal and converting the analog signal to the first sampled signal in synchronization with clock pulses having a predetermined frequency.

14. A method according to claim 13, wherein the analog signal is a signal reproduced from a recording medium, and wherein said method extracts a tracking signal component from the analog signal.

15. A signal processing method comprising the steps of:

subtracting a second sampled signal from a first sampled signal to generate a first resultant signal, the first sampled signal being delayed for a time period of 4nT to create the second sampled signal, wherein n is a positive integer and T is a sampling time period;

adding the first resultant signal to a third sampled signal to generate a second resultant signal, the second resultant signal being delayed for a time period of 4T to create the third sampled signal;

subtracting a fourth sampled signal from the second resultant signal to generate a third resultant signal, the second resultant signal being delayed for a time period of 4mT to create the fourth sampled signal, wherein m is a positive integer;

adding the third resultant signal to a fifth sampled signal to generate a fourth resultant signal, the fourth resultant signal being delayed for a time period of 4T to create the fifth sampled signal; and subtractin a sixth sampled signal from the fourth resultant signal and for outputting a fifth resultant signal, the fourth resultant signal being delayed for a time period of 2T to create the sixth sampled signal.

16. A method according to claim 15, wherein the first sampled signal is generated by sampling a signal reproduced from a recording medium, and wherein said method extracts a tracking signal component from the first sampled signal.

17. A method according to claim 15, wherein m is equal to n.

18. A method according to claim 17, wherein the first sampled signal is generated by sampling a signal reproduced from a recording medium, and wherein said method extracts a tracking signal component from the first sampled signal.

19. A method according to claim 15, further comprising the steps of inputting an analog signal and converting the analog signal to the first sampled signal in synchronization with clock pulses having a predetermined frequency.

20. A method according to claim 19, wherein the analog signal is a signal reproduced from a recording medium, and wherein said method extracts a tracking signal component from the analog signal.

* * * * *

UNITED STATES PATENT AND TRADEMARK OFFICE
CERTIFICATE OF CORRECTION

PATENT NO. : 5,745,395

DATED : April 28, 1998

INVENTOR(S) : JUN MAKINO

It is certified that error appears in the above-identified patent and that said Letters Patent is hereby corrected as shown below:

COLUMN 4

Line 60, "Embodiment FIG. 10" should read --Embodiment ¶ FIG. 10--.

COLUMN 7

Line 7, "what" should read --to what--.

COLUMN 8

Line 1, "subtractin" should read --subtracting--; and
    Line 45, "means the steps" should read --the step--.

COLUMN 9

Line 5, "subtractin" should read --subtracting--.

Signed and Sealed this

Seventeenth Day of November, 1998

Attest:

BRUCE LEHMAN

*Attesting Officer*    *Commissioner of Patents and Trademarks*